US012742955B2

(12) United States Patent
Newberg

(10) Patent No.: US 12,742,955 B2
(45) Date of Patent: Sep. 22, 2026

(54) DIGITAL PATHOLOGY APPARATUS HOUSING WITH RAIL SYSTEM, SPEAKERLESS AUDIO SYSTEM, AND ELECTROMAGNETIC RADIATION SHIELDING

(71) Applicant: LEICA BIOSYSTEMS IMAGING, INC., Vista, CA (US)

(72) Inventor: Nicholas Newberg, Vista, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 948 days.

(21) Appl. No.: 17/631,394

(22) PCT Filed: Aug. 6, 2020

(86) PCT No.: PCT/US2020/045180
§ 371 (c)(1),
(2) Date: Jan. 28, 2022

(87) PCT Pub. No.: WO2021/026340
PCT Pub. Date: Feb. 11, 2021

(65) Prior Publication Data
US 2022/0334369 A1 Oct. 20, 2022

Related U.S. Application Data

(60) Provisional application No. 62/883,574, filed on Aug. 6, 2019.

(51) Int. Cl.
*G02B 21/26* (2006.01)
*G02B 21/36* (2006.01)

(52) U.S. Cl.
CPC .......... *G02B 21/26* (2013.01); *G02B 21/362* (2013.01)

(58) Field of Classification Search
CPC .............................. G02B 21/26; G02B 21/362
(Continued)

(56) References Cited

U.S. PATENT DOCUMENTS 6,821,072 B2 11/2004 Thiem et al.
7,133,543 B2 11/2006 Verwoerd et al.
(Continued)

FOREIGN PATENT DOCUMENTS

WO WO 2008/140742 A1 11/2008
WO WO 2019/092949 A1 5/2019

OTHER PUBLICATIONS

Aperio GT 450, screenshot of Google image search results, accessed on Jan. 17, 2019.

(Continued)

*Primary Examiner* — Bumsuk Won
*Assistant Examiner* — Grant A Gagnon
(74) *Attorney, Agent, or Firm* — FBT Gibbons LLP

(57) ABSTRACT

A digital pathology apparatus includes a housing with a rail system that allows the housing to slide off of the apparatus to expose the internal elements of the apparatus for easy maintenance. The housing includes a latch and sensor system that securely latches the housing in the closed position and senses when the housing is opened so that the moving parts of the apparatus can be safely stopped to avoid potential injury. The housing also includes electromagnetic shielding on a minimal portion of its interior surface to reduce electromagnetic radiation emanating from the apparatus. The digital pathology apparatus also includes a speakerless audio system that engages with a portion of the interior surface of the housing that is not covered with electromagnetic shielding. The speakerless audio system
(Continued)

provides an audio user interface while maintaining a contiguous surface on the housing to cover the digital pathology apparatus.

20 Claims, 15 Drawing Sheets

(58) Field of Classification Search
USPC .......................................................... 359/391
See application file for complete search history.

(56) References Cited

U.S. PATENT DOCUMENTS

| | | | | |
|---|---|---|---|---|
| 7,273,000 | B2 | 9/2007 | Thiem et al. | |
| 7,722,811 | B2 | 5/2010 | Konrad et al. | |
| 9,671,322 | B2 | 6/2017 | Berberich | |
| 2012/0003627 | A1 | 1/2012 | Scholl et al. | |
| 2015/0226759 | A1 | 8/2015 | Connolly et al. | |
| 2016/0233912 | A1 | 8/2016 | Thomas et al. | |
| 2016/0266362 | A1* | 9/2016 | Kapanidis | G02B 21/0088 |
| 2023/0324428 | A1* | 10/2023 | Suenari | G01N 35/025<br>422/64 |

OTHER PUBLICATIONS

Leica Biosystems: “Leica Aperio GT 450 RUO”, uploaded Jul. 30, 2019, retrieved from the internet <https://vimeo.com/350887835>, accessed Sep. 8, 2022.
Extended European Search Report dated Nov. 24, 2023, for Application No. 23202805.0, 8 pages.
International Search Report and Written Opinion dated Jan. 11, 2021, for International Application No. PCT/US2020/045180, 16 pages.

* cited by examiner

DIGITAL PATHOLOGY APPARATUS HOUSING WITH RAIL SYSTEM, SPEAKERLESS AUDIO SYSTEM, AND ELECTROMAGNETIC RADIATION SHIELDING

CROSS-REFERENCE TO RELATED APPLICATIONS

The present application claims priority to U.S. Patent Provisional App. No. 62/883,574, filed Aug. 6, 2019, which is hereby incorporated herein by reference as if set forth in full. In addition, the present application is related to the following applications, each of which are all hereby incorporated herein by reference as if set forth in full:

- International Patent App. No. PCT/US2016/053581, filed Sep. 23, 2016;
- International Patent App. No. PCT/US2017/028532, filed Apr. 20, 2017;
- International Patent App. No. PCT/US2018/063456, filed Nov. 30, 2018;
- International Patent App. No. PCT/US2018/063460, filed Nov. 30, 2018;
- International Patent App. No. PCT/US2018/063450, filed Nov. 30, 2018;
- International Patent App. No. PCT/US2018/063461, filed Nov. 30, 2018;
- International Patent App. No. PCT/US2018/062659, filed Nov. 27, 2018;
- International Patent App. No. PCT/US2018/063464, filed Nov. 30, 2018;
- International Patent App. No. PCT/US2018/054460, filed Oct. 4, 2018;
- International Patent App. No. PCT/US2018/063465, filed Nov. 30, 2018;
- International Patent App. No. PCT/US2018/054462, filed Oct. 4, 2018;
- International Patent App. No. PCT/US2018/063469, filed Nov. 30, 2018;
- International Patent App. No. PCT/US2018/054464, filed Oct. 4, 2018;
- International Patent App. No. PCT/US2018/046944, filed Aug. 17, 2018;
- International Patent App. No. PCT/US2018/054470, filed Oct. 4, 2018;
- International Patent App. No. PCT/US2018/053632, filed Sep. 28, 2018;
- International Patent App. No. PCT/US2018/053629, filed Sep. 28, 2018;
- International Patent App. No. PCT/US2018/053637, filed Sep. 28, 2018;
- International Patent App. No. PCT/US2018/062905, filed Nov. 28, 2018;
- International Patent App. No. PCT/US2018/063163, filed Nov. 29, 2018;
- International Patent App. No. PCT/US2017/068963, filed Dec. 29, 2017;
- International Patent App. No. PCT/US2019/020411, filed Mar. 1, 2019;
- U.S. patent application Ser. No. 29/631,492, filed Dec. 29, 2017;
- U.S. patent application Ser. No. 29/631,495, filed Dec. 29, 2017;
- U.S. patent application Ser. No. 29/631,499, filed Dec. 29, 2017; and
- U.S. patent application Ser. No. 29/631,501, filed Dec. 29, 2017.

BACKGROUND

Field of the Invention

The present invention generally relates to a digital pathology apparatus and more particularly relates to a housing that integrates with a rail system, a speakerless audio system, and shields electromagnetic radiation from the digital pathology apparatus.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology exploded and is currently regarded as one of the most promising avenues of diagnostic medicine in order to achieve even better, faster and cheaper diagnosis, prognosis and prediction of cancer and other important diseases.

In pathology, a large number of devices are used in the laboratory for sample preparation and processing. For example, a tissue processor is used to fix and dehydrate biological samples (e.g., see U.S. Pat. No. 7,722,811) and an embedder is used to suspend a sample in a paraffin block (e.g., see U.S. Pat. No. 9,671,322). The paraffin block is cut into thin slices using a mictrotome and then the slices are positioned on a specimen slide (e.g., see U.S. Pat. No. 7,273,000). The slides are then processed to stain the tissue samples thereon (tissue samples are also referred to herein as specimens) by bathing the slides in solutions having one or more reagents (e.g., see U.S. Pat. No. 6,821,072). After staining, a coverslip is adhered to the slide over the specimen using a coverslipper (e.g., U.S. Pat. No. 6,821,072). After staining and coverslipping, the slides are ready to be viewed by a microscope or scanned into a digital slide using a digital slide scanner (e.g., see U.S. Pat. No. 7,133,543).

Each of the various systems involved in pathology typically are electronic systems and therefore the systems produce electromagnetic radiation that must be mitigated. The systems also typically are automated in some fashion and therefore have a user interface and the need to produce audio feedback to an operator. Additionally, these systems are complicated laboratory machines and need periodic maintenance that requires access to the internal components of the system. Accordingly, what is needed is a system and method that overcomes significant problems found in the conventional systems and meets the market need as described above.

SUMMARY

Accordingly, described herein is a housing system for use with a digital pathology apparatus (e.g., tissue processor, embedder, mictrotome, stainer, coverslipper, and scanner) that includes a sensor and latch system to identify when the housing is in an open position. The housing system is configured to slide along a rail system to allow access to the internal elements of the apparatus and securely latch when closed. The housing system includes at least one opening on at least one side and also includes an electromagnetic shielding material applied to a portion of the internal surface of the housing. The housing system also includes a speakerless audio system the includes one or more exciters that engage an internal surface of the housing that is not covered by the electromagnetic shielding material.

In one aspect, a digital pathology apparatus includes a base having a left side, a right side, a front side, an end side, and a bottom surface. A portion of the bottom surface is configured to engage a surface upon which the digital pathology apparatus is supported. The digital pathology apparatus also includes a back extending upward along the end side of the base and a bearing system having a plurality of bearing sets, at least one left side bearing set positioned along the left side of the base and at least one right side bearing set positioned along the right side of the base. The digital pathology apparatus also includes a housing having a left side having a left lower edge, a right side having a right lower edge, a front side having a front lower edge, and a top side connecting the left side and the right side and defining a U shape for the housing. The left lower edge, the right lower edge and the front lower edge are substantially parallel to each other. The digital pathology apparatus also includes a left side rail secured to the left lower edge of the housing and a right side rail secured to the right lower edge of the housing, The left side rail is configured to engage the at least one left side bearing set and the right side rail configured to engage the at least one right side bearing set. The digital pathology apparatus also includes a latching system configured to secure the housing in a closed position and a sensor system configured to determine when the housing is in a closed position and when the housing is in an open position. Additionally, the left side rail and right side rail of the housing are configured to slide along the at least one left side bearing set and the at least one right side bearing set, respectively, to position the housing in a closed position or an open position.

In one aspect, a digital pathology apparatus includes a base having a top surface and a bottom surface. The top surface is configured to support a plurality of electrical and mechanical components and the bottom surface is configured to engage a surface upon which the digital pathology apparatus is supported. The digital pathology apparatus also includes a housing having a plurality of sides and a top. The housing is configured to engage the base and cover the plurality of electrical and mechanical components. The plurality of electrical and mechanical components include one or more speakerless audio assemblies, where each speakerless audio assembly includes an exciter configured to contact the housing when the housing is engaged with the base and covering the plurality of electrical and mechanical components. The digital pathology apparatus may also include a spring arm positioned to press the exciter into contact with the housing with a predetermined amount of tension. The digital pathology apparatus may also include a processor configured to control the exciter to vibrate against a surface of the housing to produce a desired sound.

In one aspect, a digital pathology apparatus includes a base having a top surface and a bottom surface. The top surface is configured to support a plurality of electrical components and the bottom surface is configured to engage a surface upon which the digital pathology apparatus is supported. The digital pathology apparatus also includes a housing having a plurality of sides and a top. The housing is configured to engage the base and cover the plurality of electrical components in the closed position. The housing has an interior surface and an exterior surface and at least one side of the housing includes one or more openings. The digital pathology apparatus also includes an electromagnetic shielding material applied to only a portion of the interior surface of the housing.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Embodiments disclosed herein describe a digital pathology apparatus (e.g., tissue processor, embedder, mictrotome, stainer, coverslipper, and scanner) that includes a housing configured with a rail system, a speakerless audio system and an electromagnetic radiation shielding. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
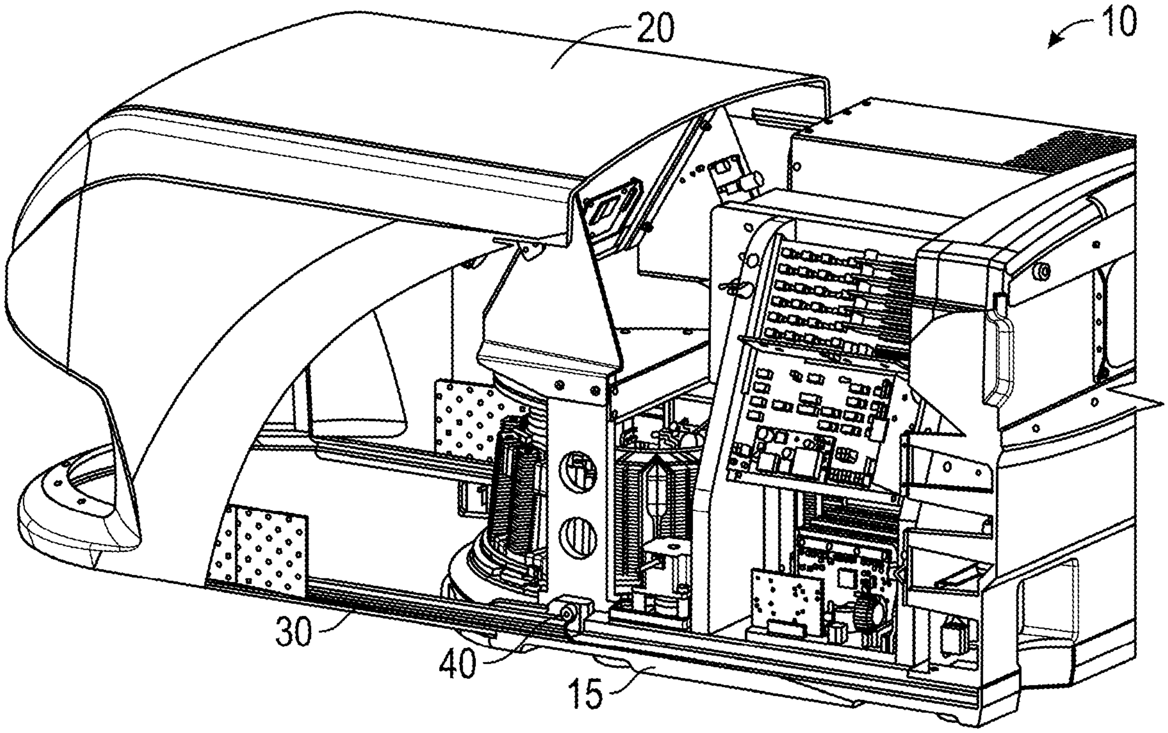
FIG. 1A is a perspective view diagram illustrating an example digital pathology apparatus according to an embodiment of the invention.

FIG. 1A is a perspective view diagram illustrating an example digital pathology apparatus 10 according to an embodiment of the invention. In the illustrated embodiment, the apparatus 10 includes a base 15 that supports the apparatus 10 and a housing 20 that is configured with rails 30 that guide the housing along one or more bearings (e.g., bearing 40) to alternately open the housing to expose internal components of the apparatus for access by an operator and/or maintenance and to close the housing for secure operation.

Figure 1B:
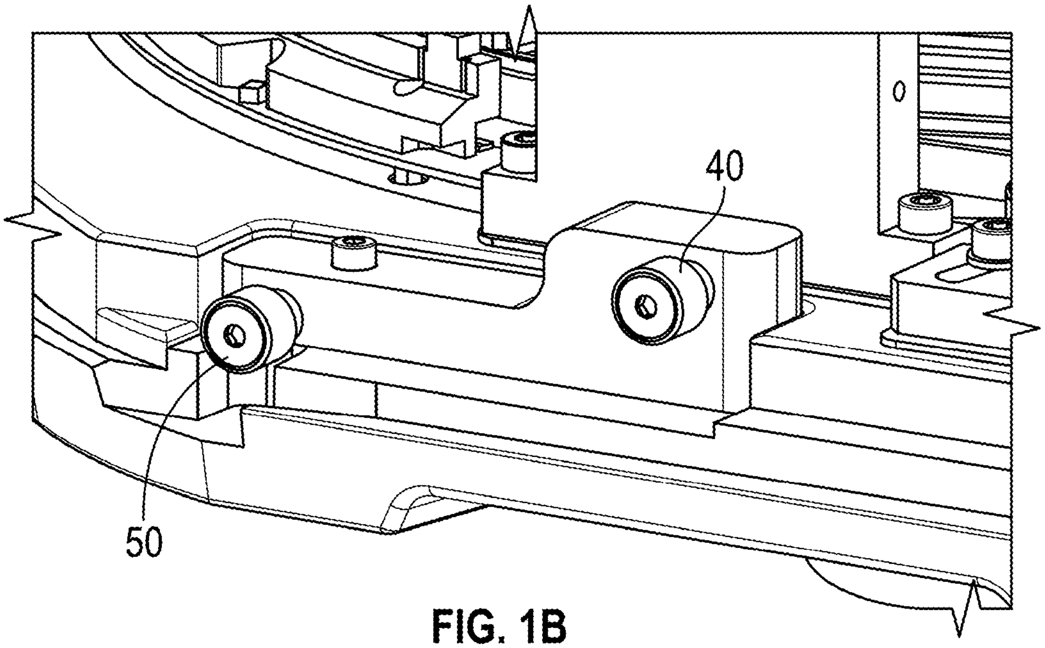
FIG. 1B is a perspective view diagram illustrating an example set of bearings on a digital pathology apparatus according to an embodiment of the invention.

FIG. 1B is a perspective view diagram illustrating an example set of bearings 40, 50 on a digital pathology apparatus 10 according to an embodiment of the invention. In the illustrated embodiment, the bearings 40, 50 include an upper bearing 40 and a lower bearing 50 that are positioned relative to each other to so that the rail 30 of the housing is guided along a predetermined path when the housing is moving from an open to a closed position or vice-versa. In the illustrated embodiment, the set of bearings 40, 50 are positioned near a front portion of the apparatus 10 and a vertical distance between a lower surface of the upper bearing 40 and an upper surface of the lower bearing 50 is substantially the same as the thickness of the rail 30.

Figure 1C:
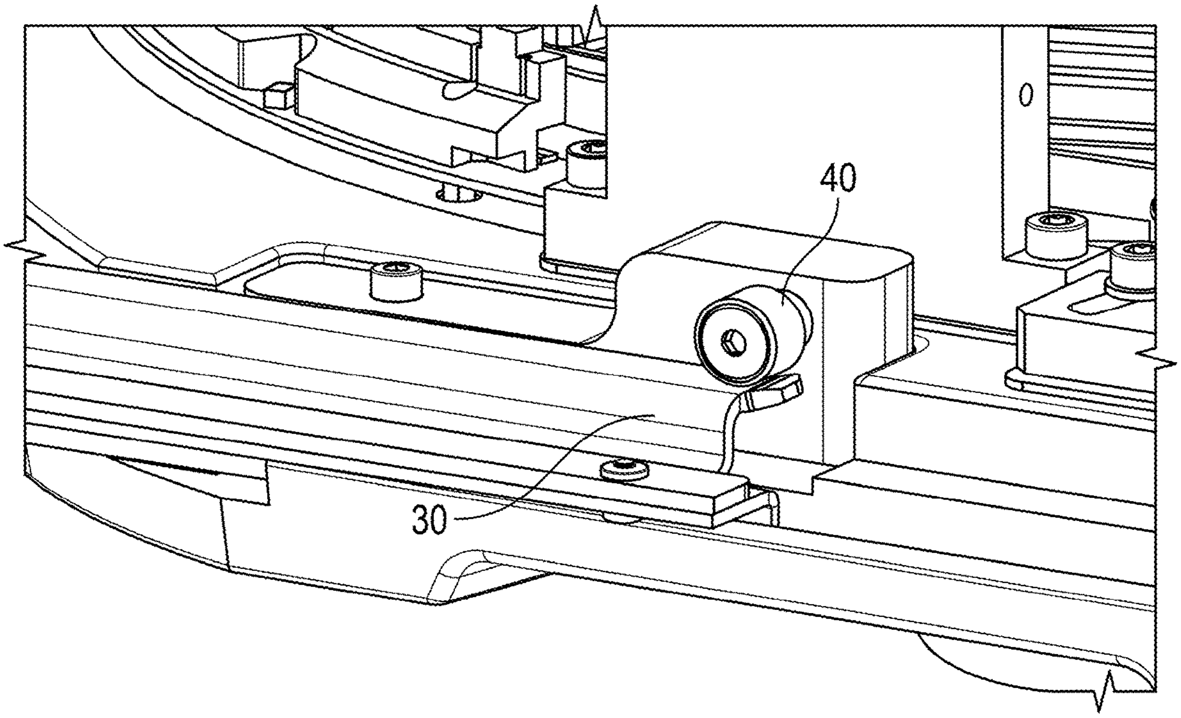
FIG. 1C is a perspective view diagram illustrating an example housing engaging a set of bearings on a digital pathology apparatus according to an embodiment of the invention.

FIG. 1C is a perspective view diagram illustrating an example housing 20 engaging a set of bearings 40, 50 on a digital pathology apparatus 10 according to an embodiment of the invention. In the illustrated embodiment, an upper surface of the rail 30 engages a lower surface of the upper bearing 40 and similarly, a lower surface of the rail 30 engages an upper surface of the lower bearing 50. Advantageously, when the housing 20 is engaged with a set of bearings 40, 50 on both the right side and the left side of the apparatus 10, the housing 20 is securely balanced and able to smoothly roll from an open position to a closed position and vice-versa.

Figure 2A:
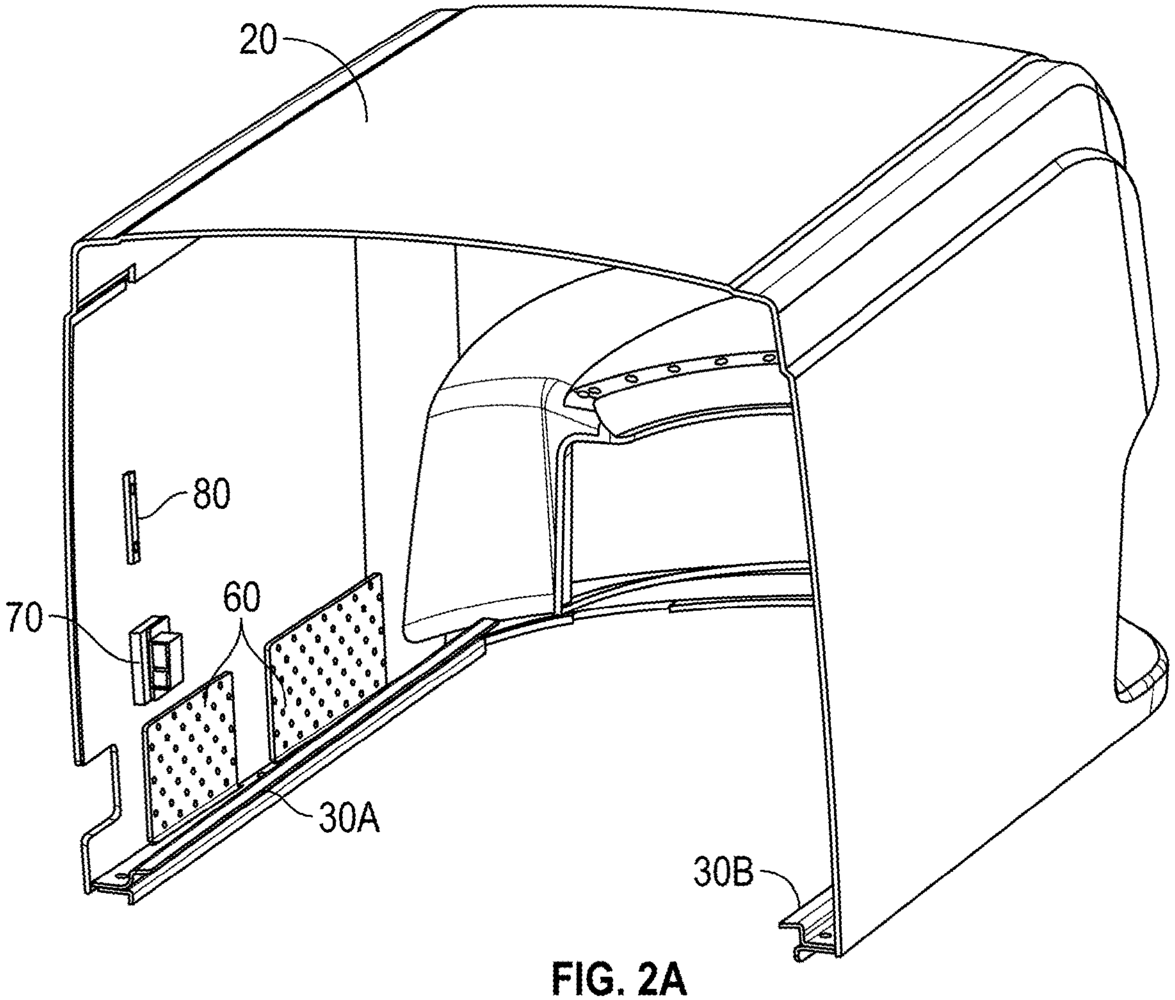
FIG. 2A is a perspective view diagram illustrating an example housing with a rail system according to an embodiment of the invention.

FIG. 2A is a perspective view diagram illustrating an example housing 20 with a rail system 30 according to an embodiment of the invention. In the illustrated embodiment, the rail system 30 includes a left rail 30A secured to a bottom left edge of the housing 20 and a right rail 30B secured to a bottom right edge of the housing 20. The rail system 30 also includes adhesive flanges 60 that extend upward from the rail system 30. The adhesive flanges 60 are configured to be secured to the housing 20 and increase the stability of the connection between the rail system 30 and the housing 20. Also shown in the illustrated embodiment is a first latch portion 70 and a first sensor portion 80 that are secured to an inner surface of the housing 20.

Figure 2B:
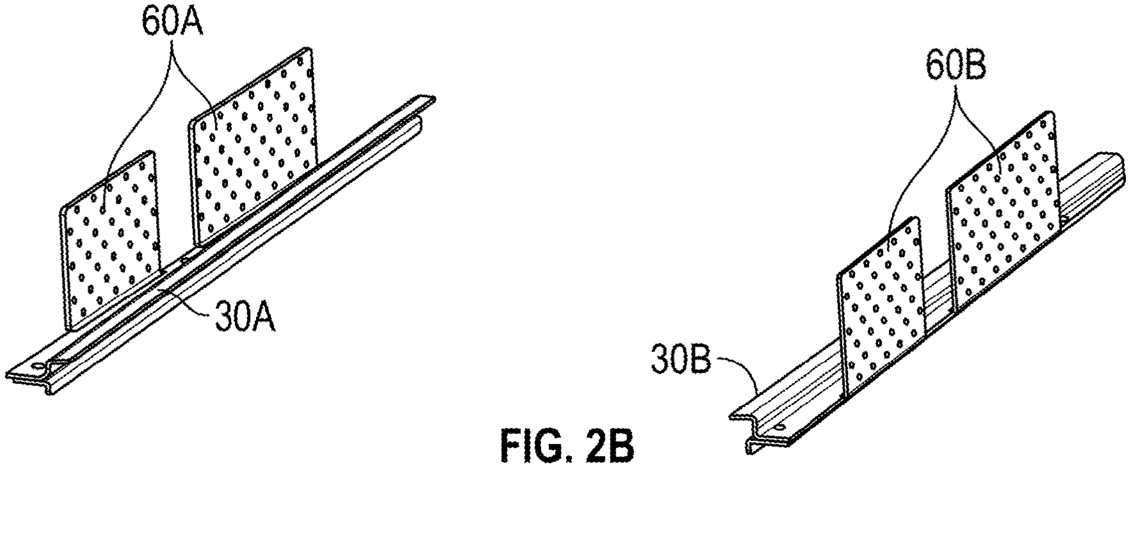
FIG. 2B is a perspective view diagram illustrating an example rail system according to an embodiment of the invention.

FIG. 2B is a perspective view diagram illustrating an example rail system 30 according to an embodiment of the invention. In the illustrated embodiment, the rail system 30 includes adhesive flanges 60A that extend upward from the left rail 30A and adhesive flanges 60B that extend upward from the right rail 30B. The rail system 30 is configured to be secured to lower edges of the housing 20 by one or more fasteners and adhesive. The adhesive flanges 60A and 60B may be secured by one or both of fasteners and/or adhesive.

Figure 3A:
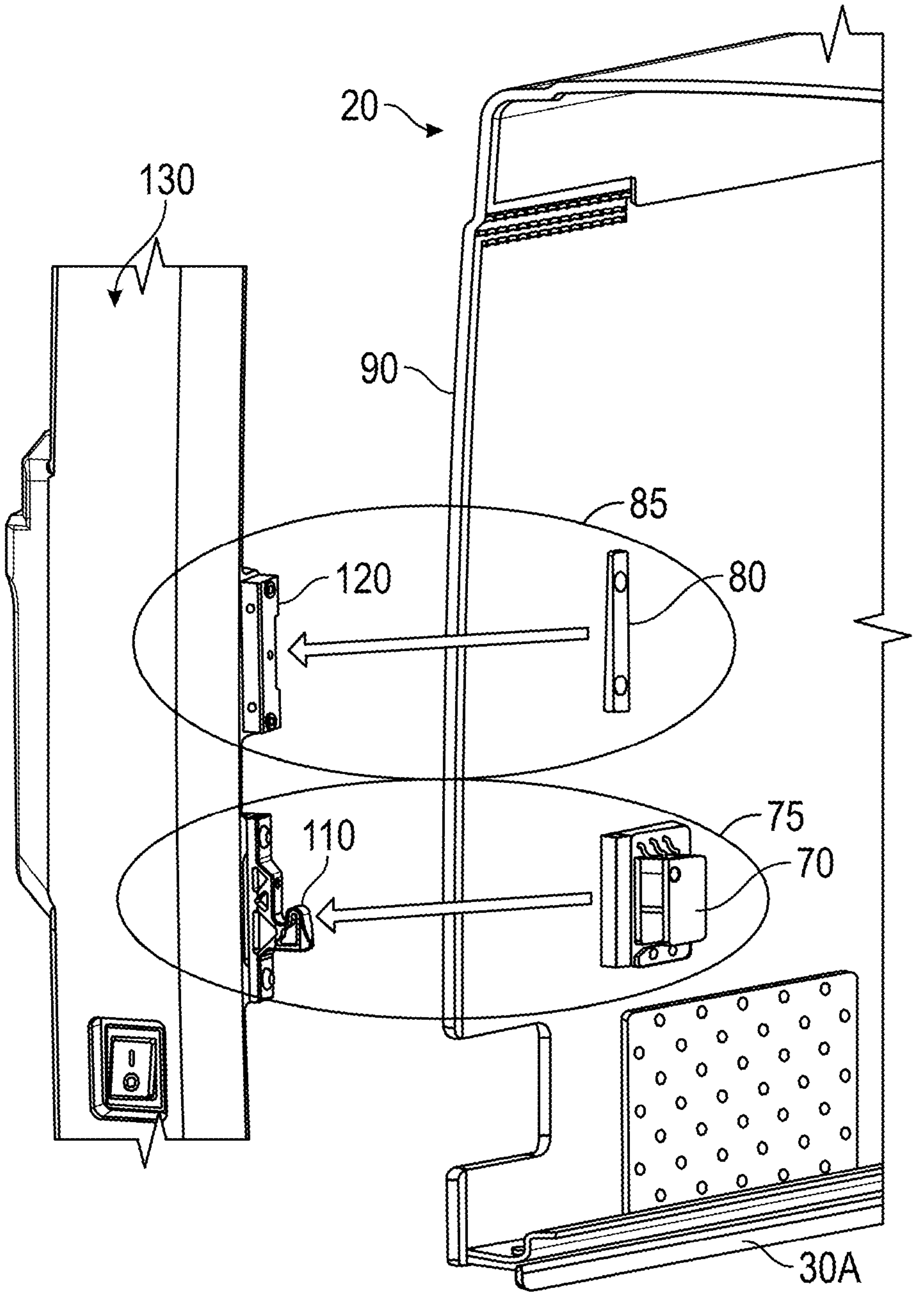
FIG. 3A is a perspective view diagram illustrating an example latching system and sensor system according to an embodiment of the invention.

FIG. 3A is a perspective view diagram illustrating an example latching system 75 and an example sensor system 85 according to an embodiment of the invention. In the illustrated embodiment, the apparatus 10 includes a back 130 of the base and the housing 20 includes a back edge 90. In the illustrated embodiment, the latching system 75 comprises a first latching portion 70 and a second latching portion 110. The two latching portions 70, 110 are configured to mechanically engage and thereby secure the housing in a closed position. In one embodiment, the latching system 75 uses friction to secure the housing in a closed position.

In the illustrated embodiment, the sensor system 85 comprises a first sensor portion 80 and a second sensor portion 120. The two sensor portions 80, 120 are configured to generate a signal or generate no signal when the two portions 80, 120 are within a predetermined proximity of each other. For example, when the two portions 80, 120 are within the predetermined proximity of each other, the sensor system 85 may generate a signal indicating that the housing 20 is in a closed position. Alternatively, when the two portions 80, 120 are not within the predetermined proximity of each other, the sensor system 85 may generate a signal indicating that the housing 20 is in an open position. The sensor system 85 may generate a first signal and a second signal to indicate the open and closed positions. Alternatively, the presence of a signal generated by the sensor system 85 may indicate one of the open or closed position while the absence of a signal generated by the sensor system 85 may indicate the other of the open or closed position. Advantageously, one or more processors such as processor 555 of FIG. 8A may be configured to monitor the signals (or absence of signals) generated by the sensor system 85 and determine whether the housing is in the open or closed position and take actions such as stopping movement of any moving parts of the apparatus 10 when the housing 20 transitions from a closed position to an open position.

Figure 3B:
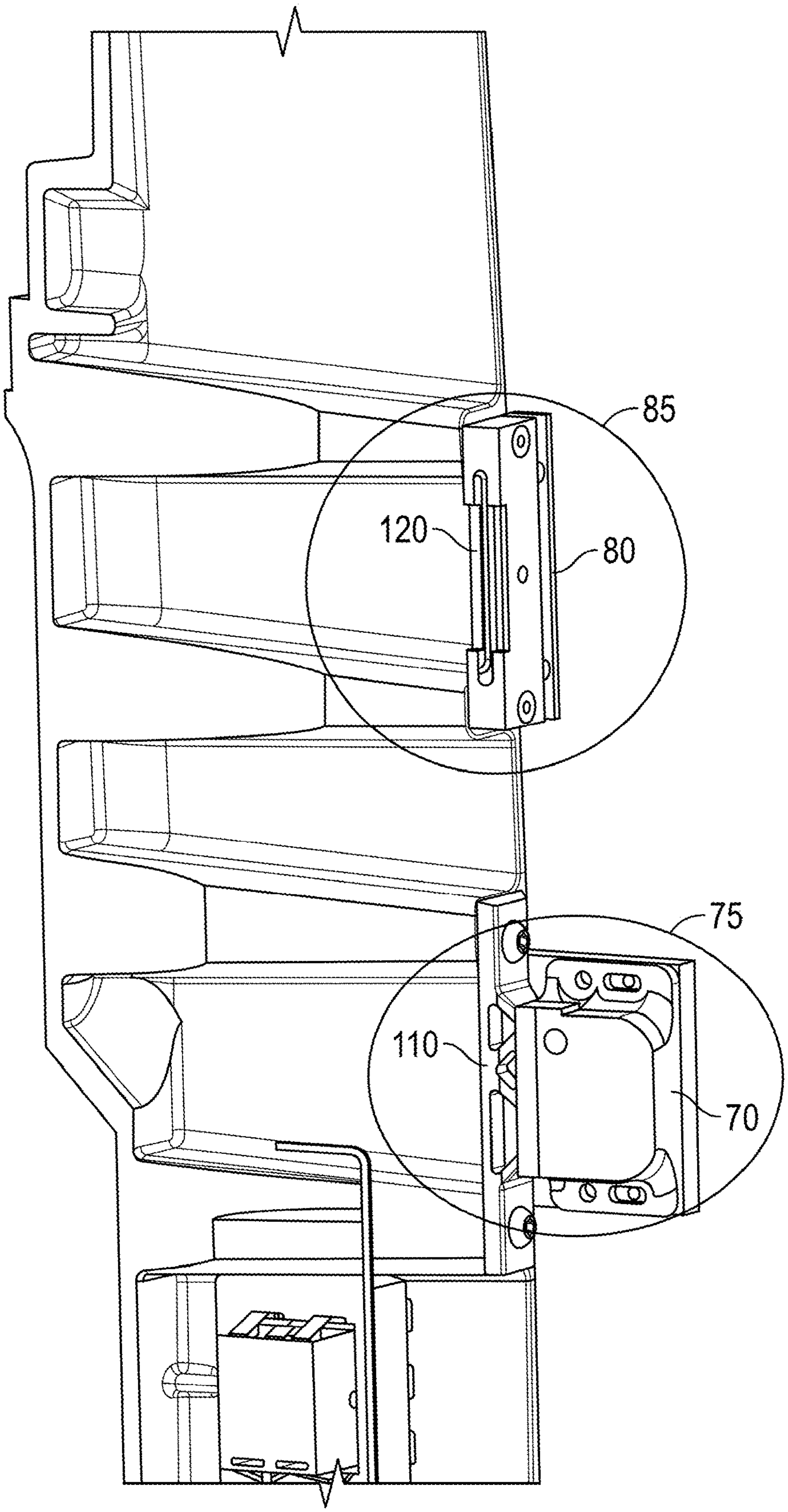
FIG. 3B is a perspective view diagram illustrating an example housing latched in a closed position according to an embodiment of the invention.

FIG. 3B is a perspective view diagram illustrating an example housing 20 latched in a closed position according to an embodiment of the invention. In the illustrated embodiment, the latch system 75 include a first latching portion 70 and a second latching portion 110 engaged with each other to secure the housing 20 in the closed position. Similarly, a first sensor portion 80 and a second sensor portion 120 are within proximity of each other such that one or more processors monitoring the sensor system 85 determines that the housing 20 is in a closed position. In an embodiment, the sensor system 85 includes a magnet 80 and a magnetic sensor 120 configured to detect the presence of the magnet 80 within a certain proximity.

Figure 3C:
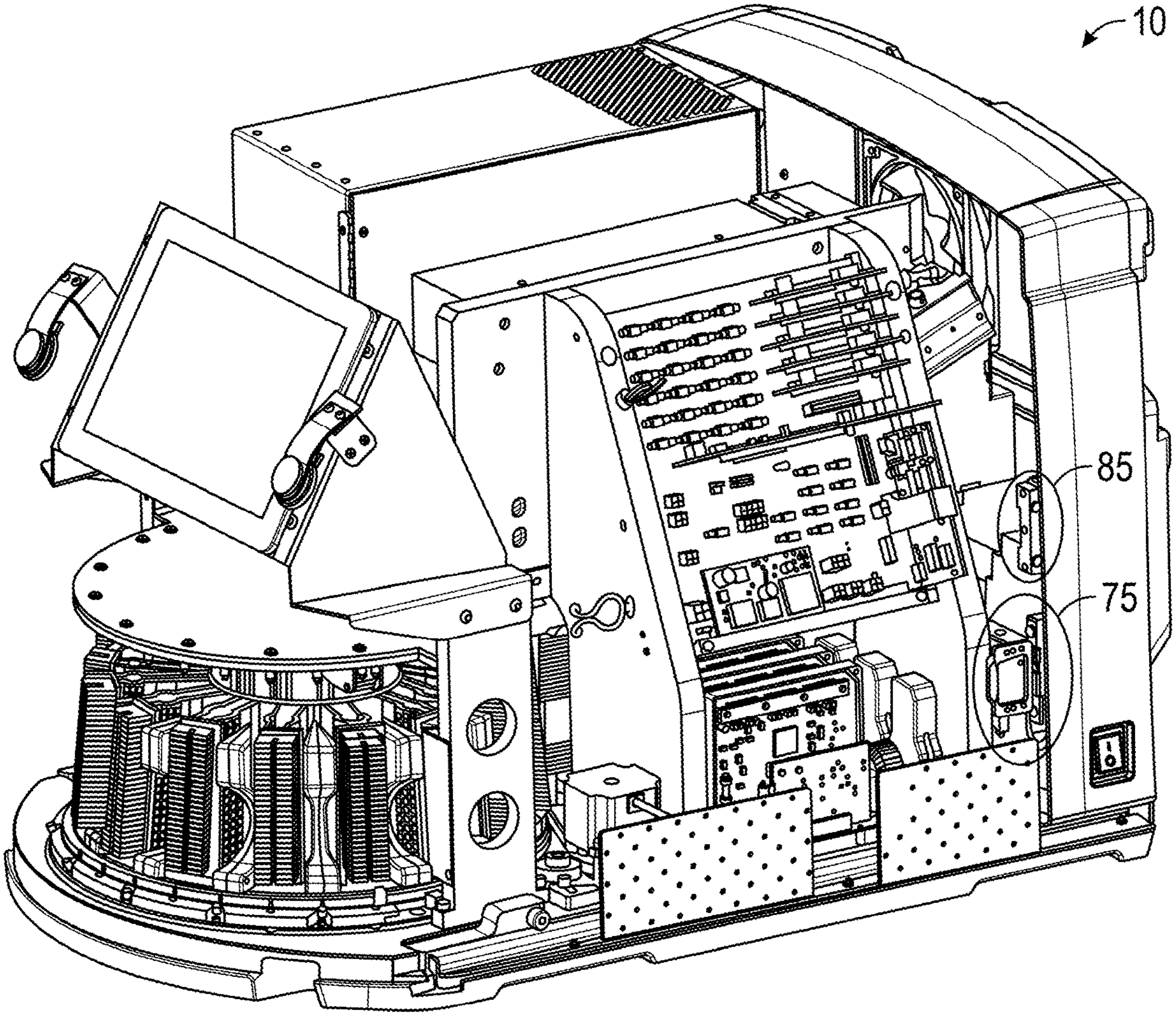
FIG. 3C is a perspective view diagram illustrating an example digital pathology apparatus with an example latching system and an example sensor system according to an embodiment of the invention.

FIG. 3C is a perspective view diagram illustrating an example digital pathology apparatus 10 with an example latching system 75 and an example sensor system 85 according to an embodiment of the invention. In the illustrated embodiment, the latching system 75 and sensor system 85 each have one of two portions positioned on the back 130 of the base and a have another of two portions positioned on the housing 20.

Figure 3D:
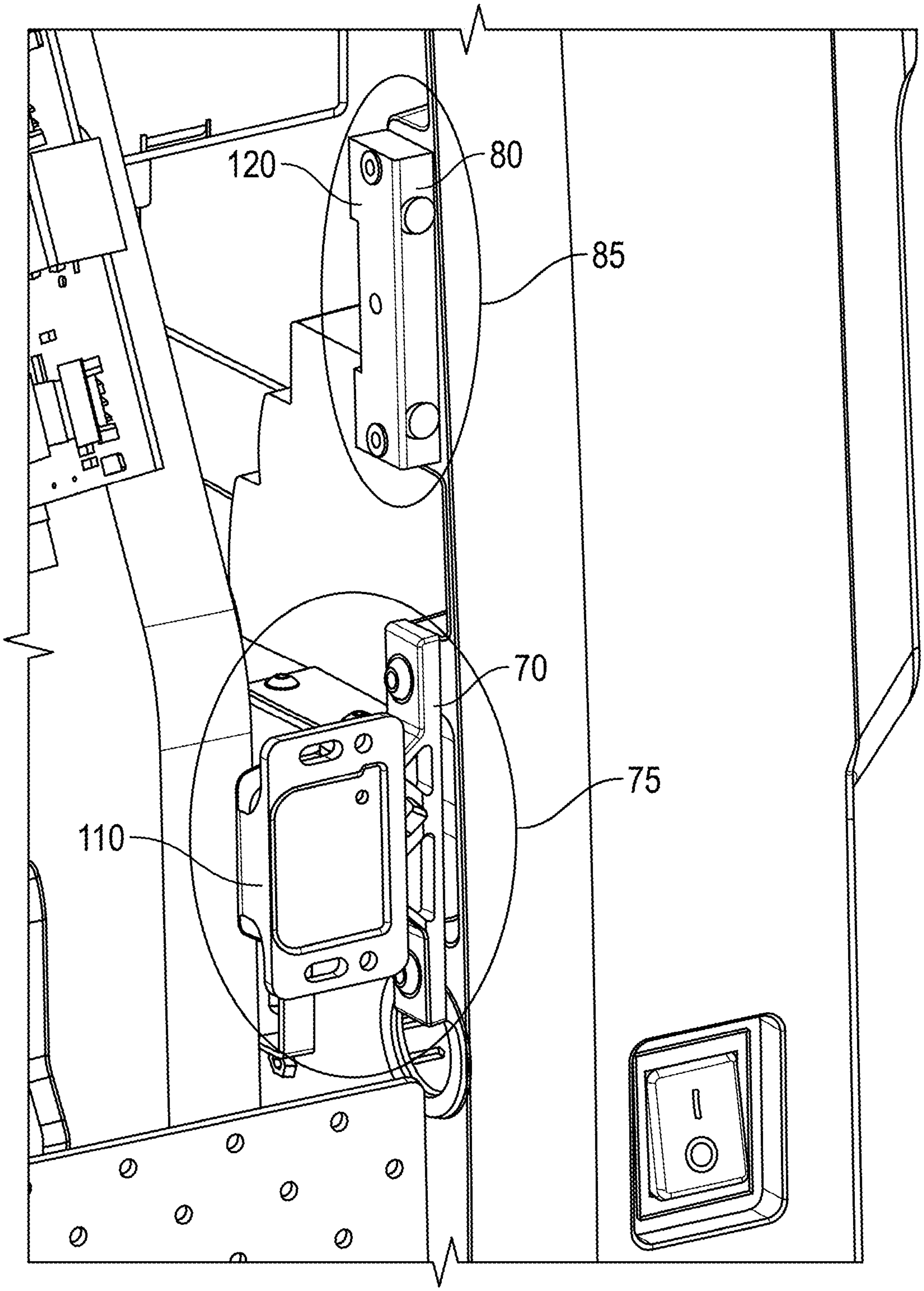
FIG. 3D is a perspective view diagram illustrating an example digital pathology apparatus with an example latching system and an example sensor system according to an embodiment of the invention.

FIG. 3D is a perspective view diagram illustrating an example digital pathology apparatus 10 with an example latching system 75 and an example sensor system 85 according to an embodiment of the invention. The illustrated embodiment shows a close up view of the system in FIG. 3C that includes the latching system 75 and the sensor system 85.

Figure 4A:
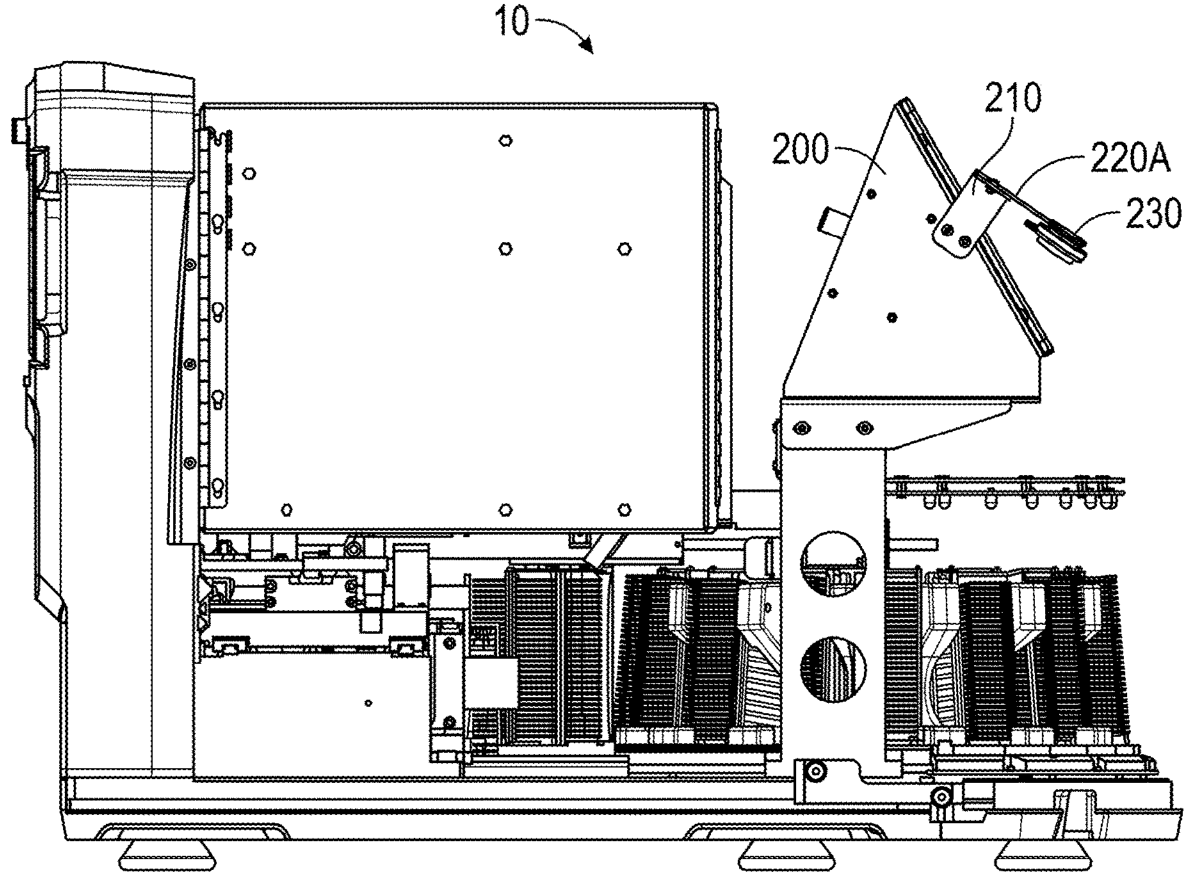
FIG. 4A is a perspective view diagram illustrating an example digital pathology apparatus with the housing removed according to an embodiment of the invention.
Figure 8A:
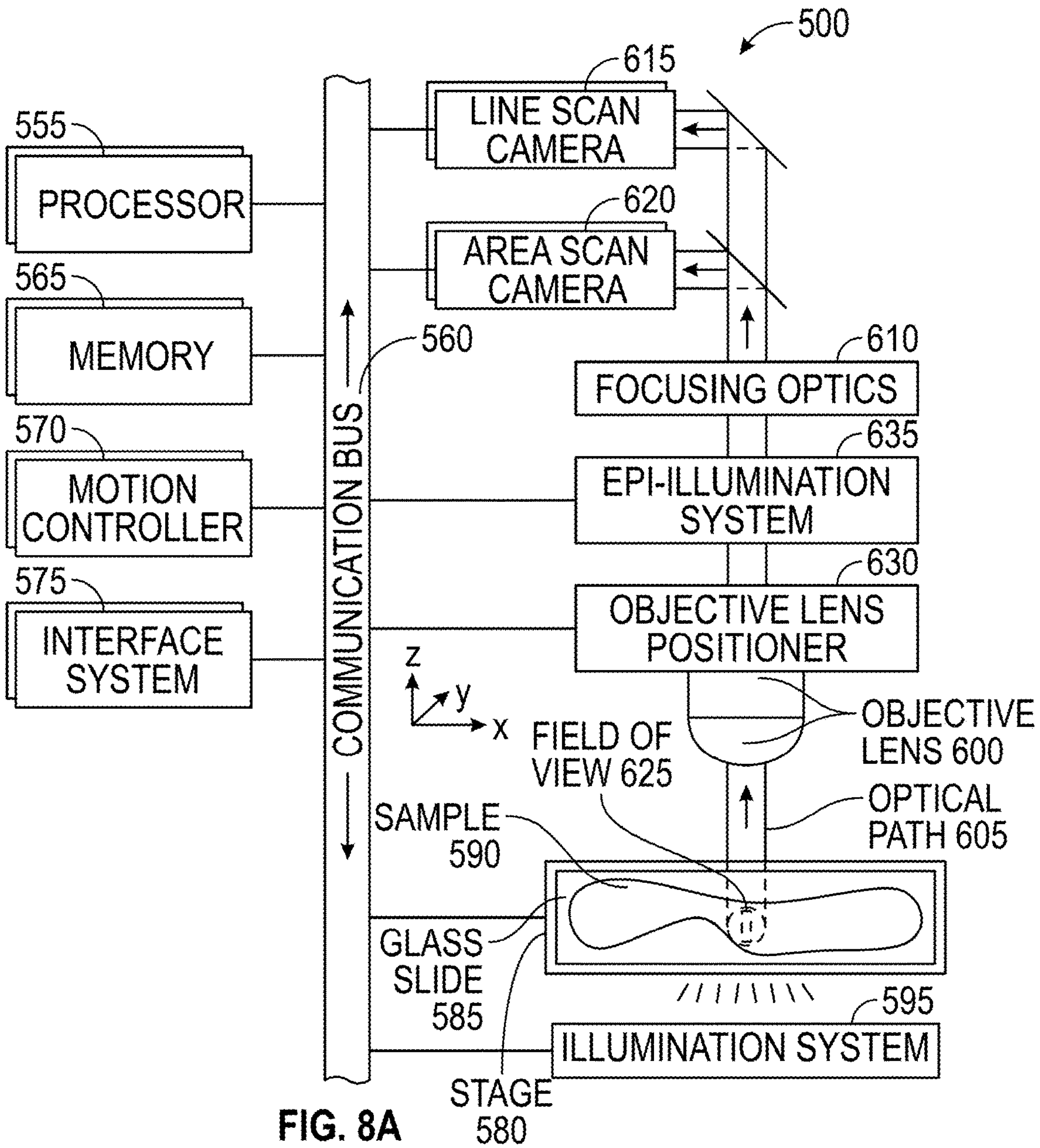
FIG. 8A is a block diagram illustrating an example processor enabled device 550 that may be used in connection with various embodiments described herein.

FIG. 4A is a perspective view diagram illustrating an example digital pathology apparatus 10 with the housing removed according to an embodiment of the invention. In the illustrated embodiment, the apparatus 10 includes a user interface mount 200 that in turn supports an exciter mount 210 that is connected to a spring arm 220A, which is shown in an extended position. The spring arm 220A supports an exciter 230 that is configured to engage with an interior surface of the housing 20 and vibrate to produce sound. Advantageously, one or more processors of the digital pathology apparatus 10 such as processor 555 of FIG. 8A is configured to control the exciter 230 to vibrate and thereby produce desired sound when the exciter 230 is engaged with the interior surface of the housing 20.

Figure 4B:
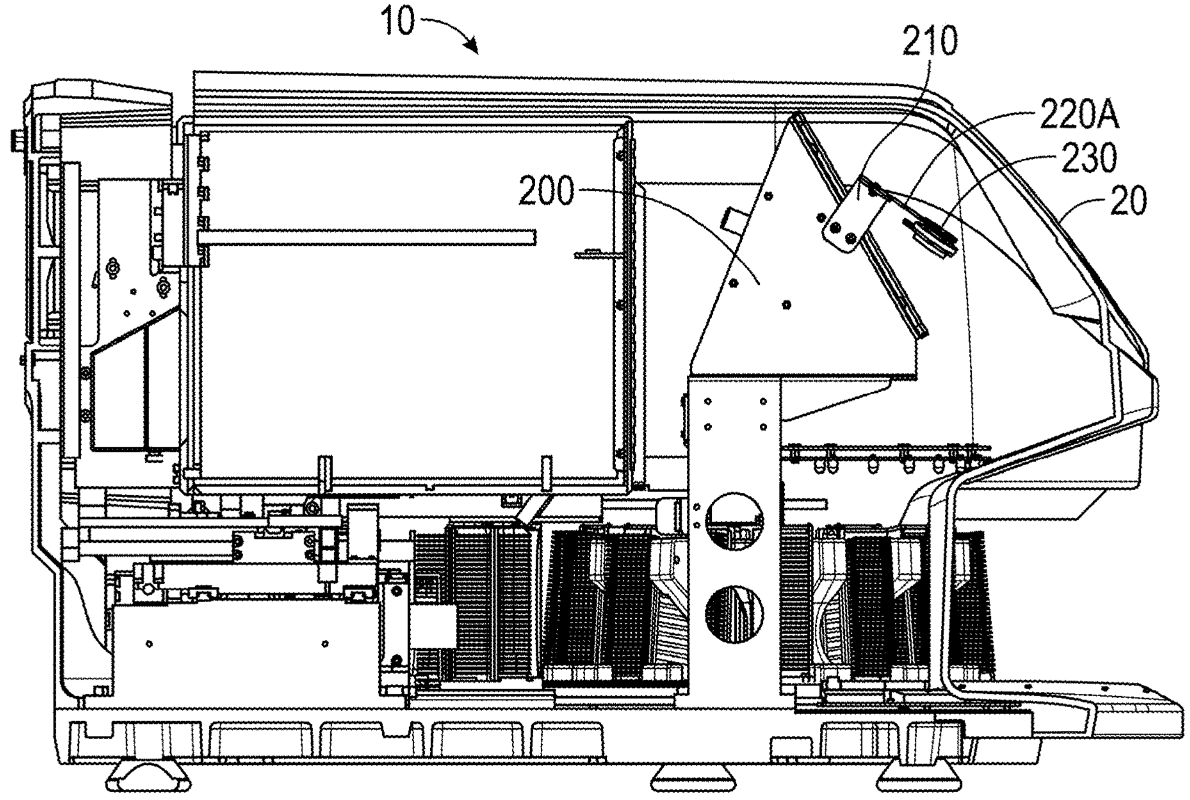
FIG. 4B is a perspective view diagram illustrating an example digital pathology apparatus with the housing in an open position according to an embodiment of the invention.

FIG. 4B is a perspective view diagram illustrating an example digital pathology apparatus 10 with the housing 20 in an open position according to an embodiment of the invention. In the illustrated embodiment, the user interface mount 200 supports the exciter mount 210 that is connected to a spring arm 220A, which is in an extended position because the housing 20 is open. The spring arm 220A supports the exciter 230, which is not engaged with the interior surface of the housing 20 in the illustrated embodiment.

Figure 4C:
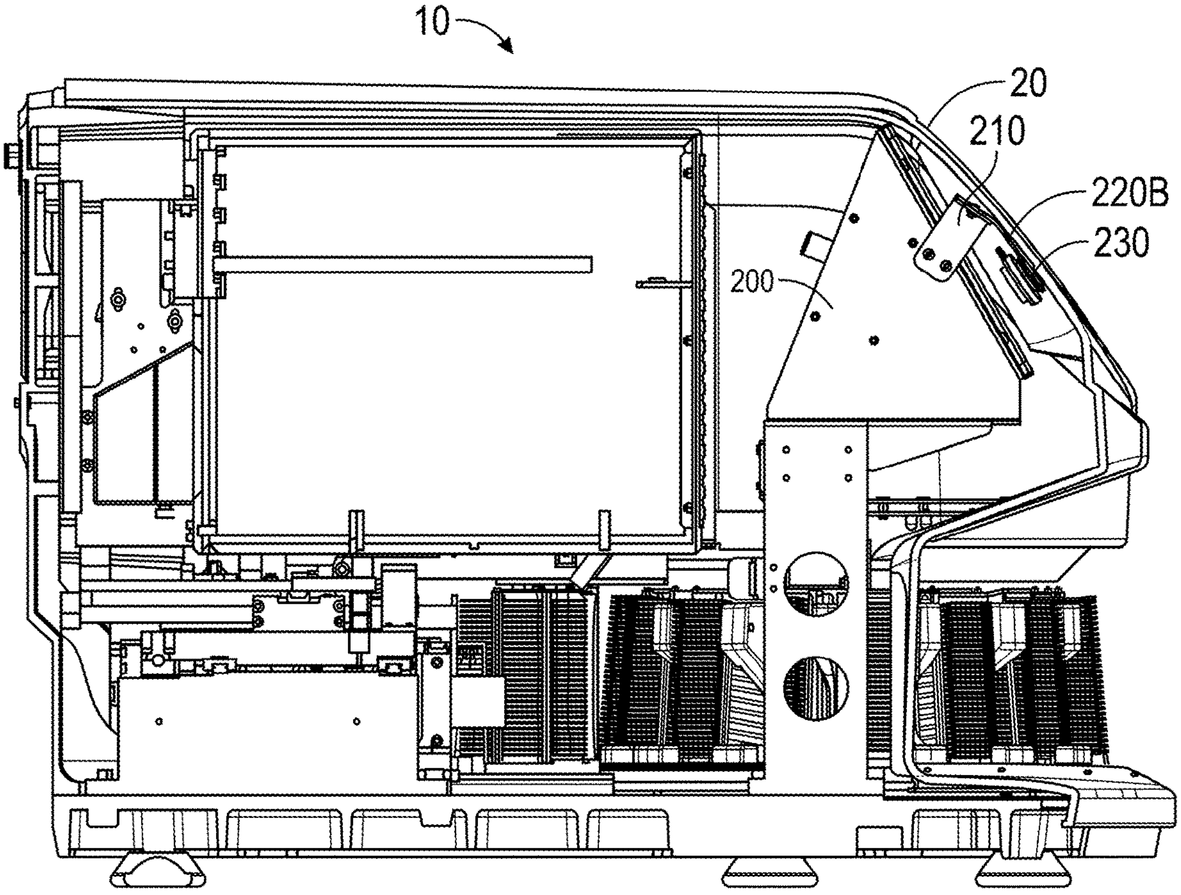
FIG. 4C is a perspective view diagram illustrating an example digital pathology apparatus with the housing in a closed and latched position according to an embodiment of the invention.

FIG. 4C is a perspective view diagram illustrating an example digital pathology apparatus 10 with the housing 20 in a closed and latched position according to an embodiment of the invention. In the illustrated embodiment, the user interface mount 200 supports the exciter mount 210 that is connected to the spring arm 220B, which is shown in a flexed position such that the exciter 230 is pressed against an interior surface of the housing 20 with a predetermined amount of tension. When the exciter 230 is engaged with the interior surface of the housing 20 and pressed against the interior surface with tension, the exciter 230 vibrates to produce sound. Advantageously, when the exciter 230 vibrates against the inner surface of the housing 20, the exciter 230 transfers vibration to an area of the outer surface of the housing 20 that is larger than the contact area between the exciter 230 and the inner surface of the housing 20 and thereby creates a broad frequency response audio signal. Advantageously, the housing 20 does not have any speaker holes cut in the housing and instead the housing 20 has a substantially contiguous surface that surrounds the apparatus 10. The substantially contiguous surface of the housing facilitated by the lack of speaker holes serves to reduce electromagnetic radiation produced by the internal electronics of the apparatus 10. In the illustrated embodiment, the housing 20 of the apparatus 10 already includes a persistent opening for a slide rack carousel and therefore eliminating additional openings for a conventional speaker facilitates reduces electromagnetic radiation emitted from the apparatus. Advantageously, one or more processors of the digital pathology apparatus 10 such as processor 555 of FIG. 8A is configured to control the exciter 230 to vibrate and thereby produce desired sound when the exciter 230 is engaged with the interior surface of the housing 20.

An additional advantage of the speakerless audio system is that conventional speakers are mounted to a hole cut into the housing and these conventional speakers are electronic devices and require power and the associated wires to deliver the power. Connecting a plurality of wires to the housing complicates the ability of the housing to be opened, e.g., for maintenance. Accordingly, the speakerless audio system is advantageous because it facilitates simple opening of the housing 20 to provide access to the internal components of the apparatus.

Figure 5A:
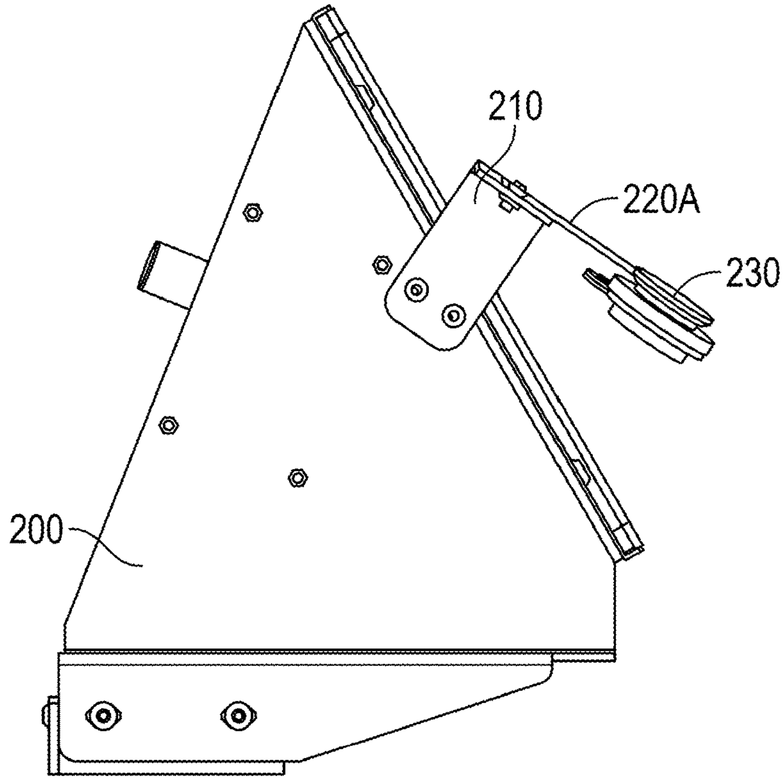
FIG. 5A is a perspective view diagram illustrating an example speakerless audio system supported on an example user interface mount of an example digital pathology apparatus with the housing in an open position according to an embodiment of the invention.

FIG. 5A is a perspective view diagram illustrating an example speakerless audio system supported on an example user interface mount 200 of an example digital pathology apparatus 10 with the housing 20 in an open position according to an embodiment of the invention. In the illustrated embodiment, the user interface mount 200 supports the exciter mount 210 that is connected to the spring arm 220A, which is shown in an extended position such that the exciter 230 is not pressed against an interior surface of the housing 20.

Figure 5B:
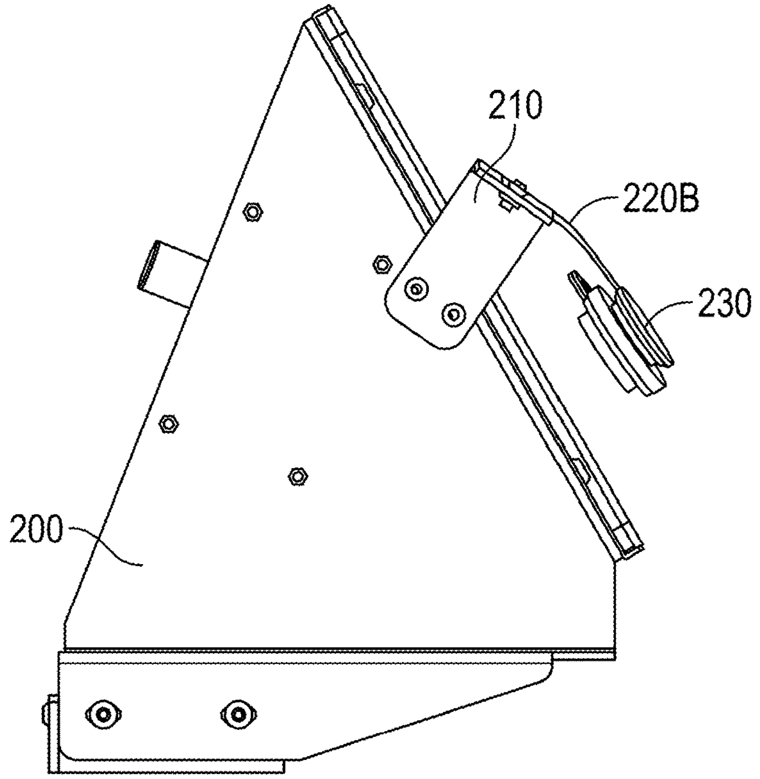
FIG. 5B is a perspective view diagram illustrating an example speakerless audio system supported on an example user interface mount of an example digital pathology apparatus with the housing in a closed and latched position according to an embodiment of the invention.

FIG. 5B is a perspective view diagram illustrating an example speakerless audio system supported on an example user interface mount 200 of an example digital pathology apparatus 10 with the housing 20 in a closed and latched position according to an embodiment of the invention. In the illustrated embodiment, the user interface mount 200 supports the exciter mount 210 that is connected to the spring arm 220B, which is shown in a flexed position such that the exciter 230 is pressed against an interior surface of the housing 20 with tension.

Figure 6A:
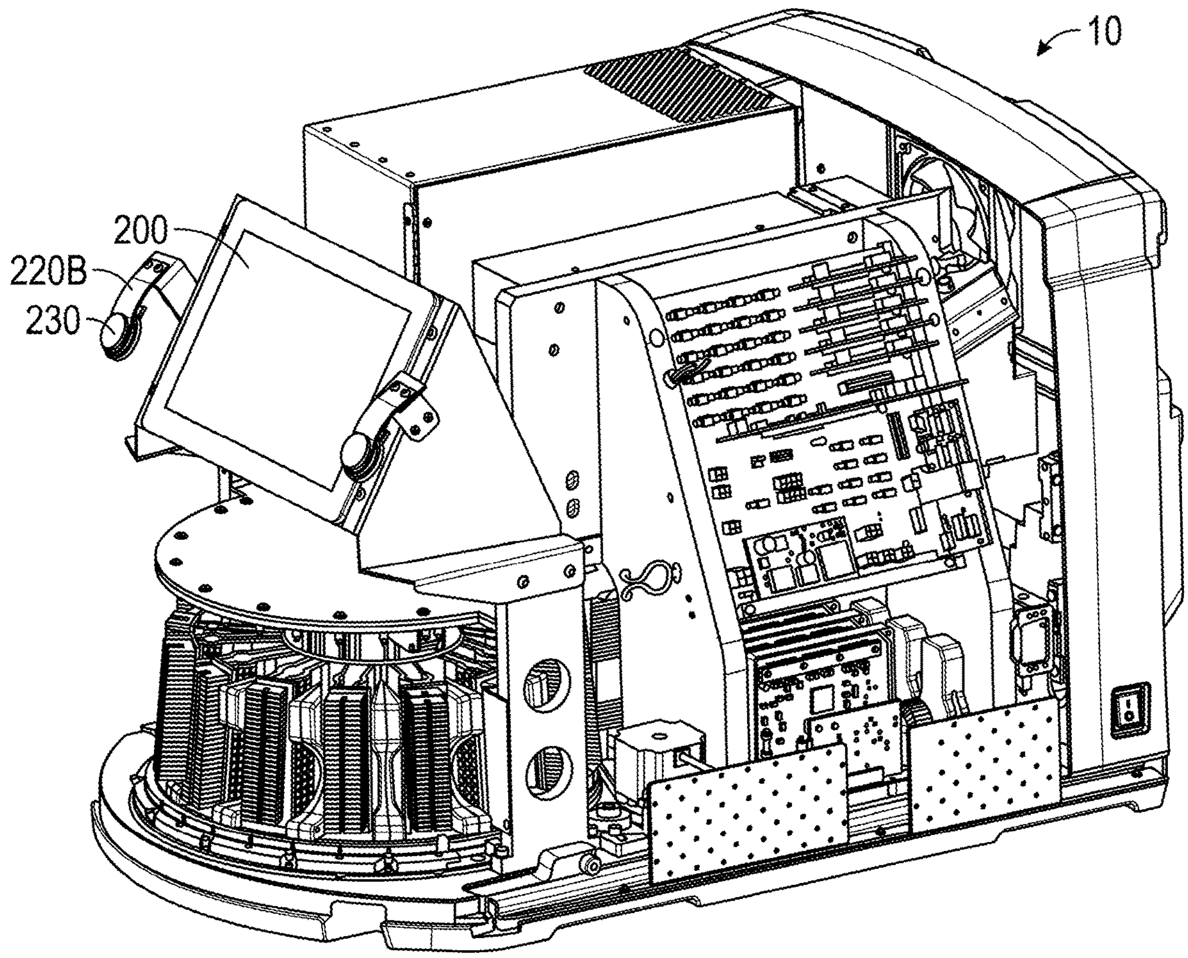
FIG. 6A is a perspective view diagram illustrating an example digital pathology apparatus according to an embodiment of the invention.

FIG. 6A is a perspective view diagram illustrating an example digital pathology apparatus 10 according to an embodiment of the invention. In the illustrated embodiment, the user interface mount 200 supports the exciter mount 210 that is connected to the spring arm 220B, which is shown in a flexed position such that the exciter 230 is pressed against an interior surface of the housing 20 with tension. Advantageously, one or more processors of the digital pathology apparatus 10 such as processor 555 of FIG. 8A is configured to control the exciter 230 to vibrate and thereby produce desired sound when the exciter 230 is engaged with the interior surface of the housing 20.

Figure 6B:
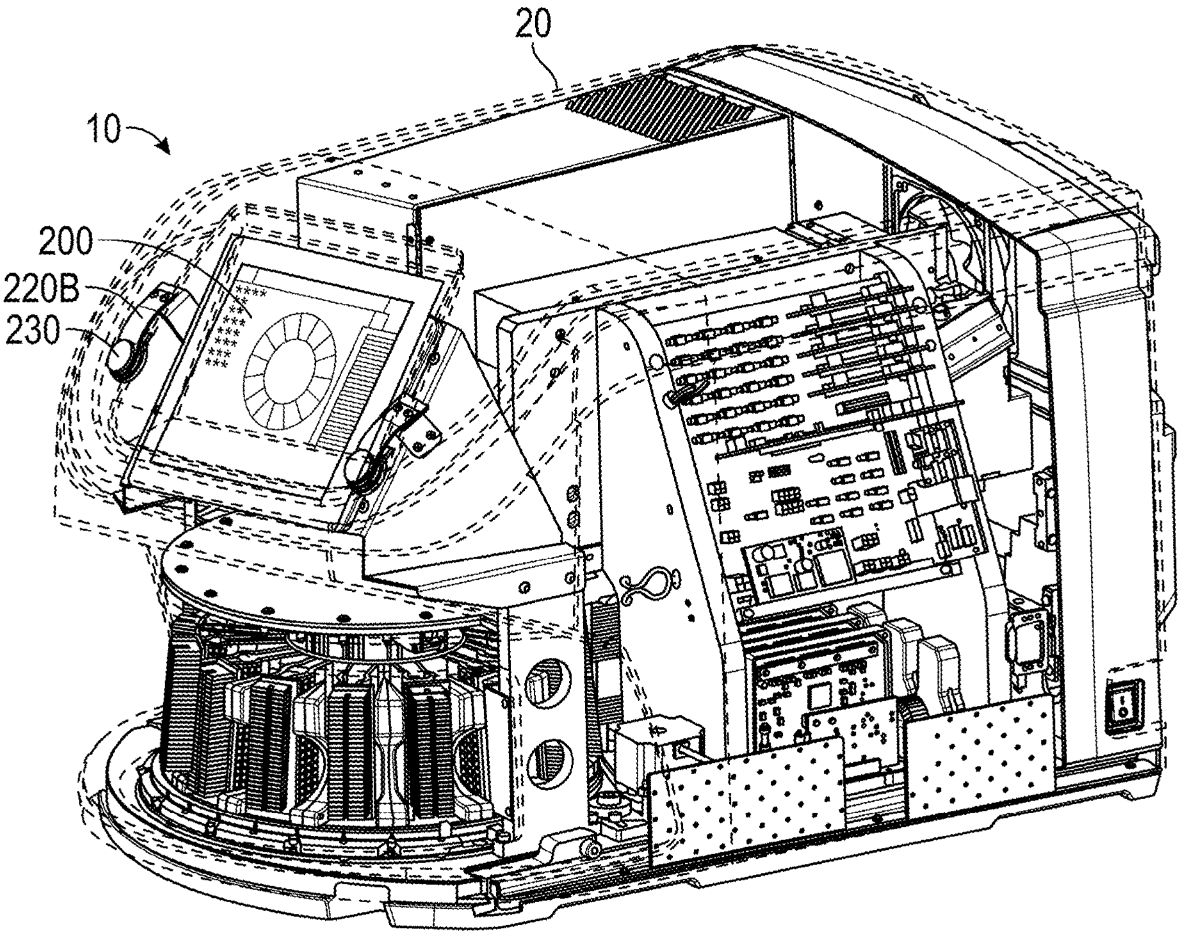
FIG. 6B is a perspective view diagram illustrating an example digital pathology apparatus according to an embodiment of the invention.

FIG. 6B is a perspective view diagram illustrating an example digital pathology apparatus 10 according to an embodiment of the invention. In the illustrated embodiment, the user interface mount 200 supports the exciter mount 210 that is connected to the spring arm 220B, which is shown in a flexed position such that the exciter 230 is pressed against an interior surface of the housing 20 with tension. In the illustrated embodiment, there are two exciters 230 positioned on the left side and the right side of the user interface. Advantageously, the positioning facilitates stereo audio to be produced by the speakerless audio system. The positioning also facilitates tactical feedback to an operator by allowing directionally appropriate sounds to be produced that correspond to tactile action. For example, if an operator inserts a slide rack into a slide rack slot on a particular side of the slide rack carousel, the speakerless audio system may cause the exciter 230 on the same side of the apparatus to produce a sound as directionally appropriate tactical feedback to the operator.

Figure 7:
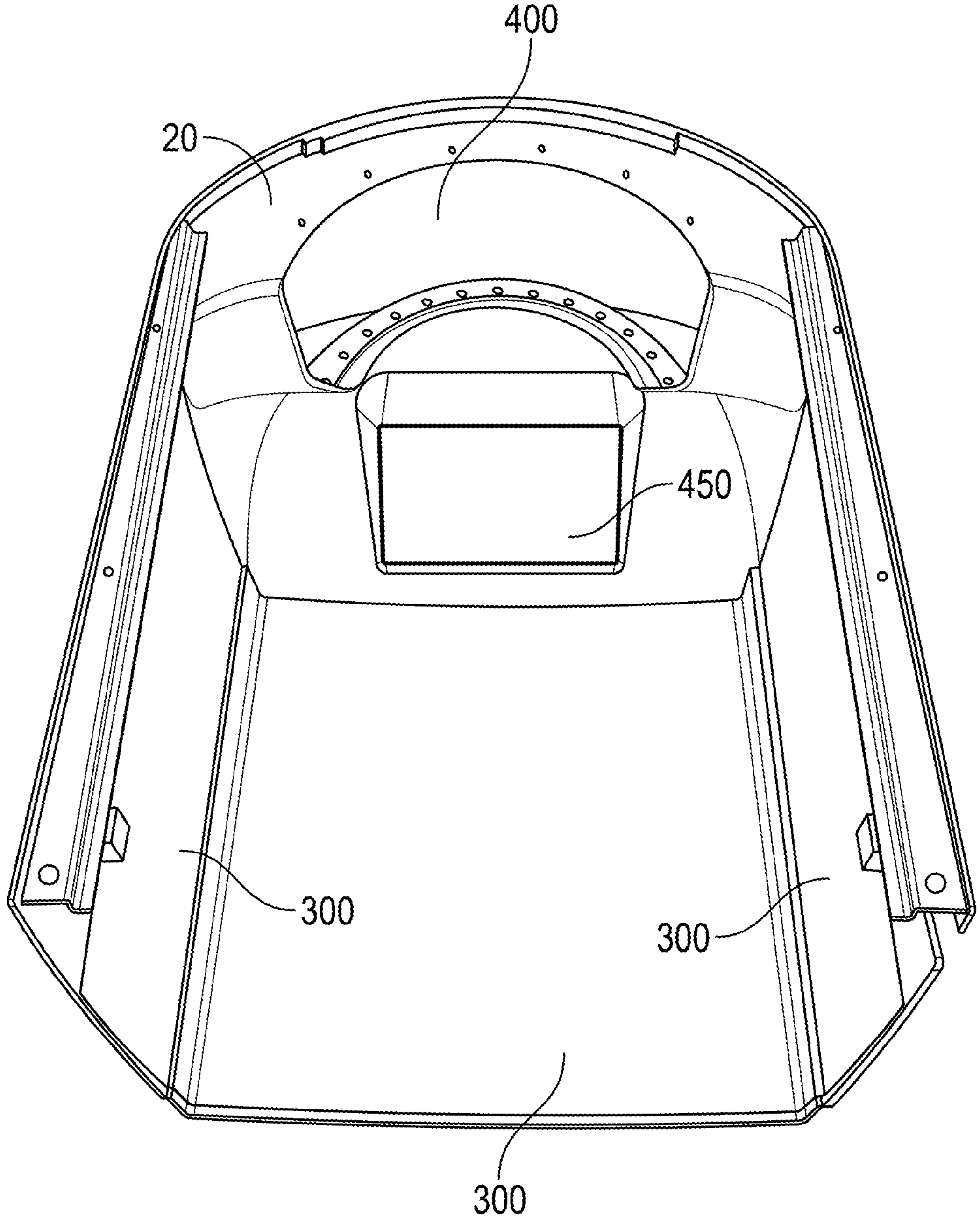
FIG. 7 is a perspective view diagram illustrating an example digital pathology apparatus housing according to an embodiment of the invention.

FIG. 7 is a perspective view diagram illustrating an example digital pathology apparatus housing 20 according to an embodiment of the invention. In the illustrated embodiment, the housing 20 has an exterior surface and an interior surface. The surface of the housing has a persistent opening 400 that allows access to a slide rack carousel. A second opening 450 allows a user interface (e.g., a touch screen) to be accessed by a user when the housing is in a closed position.

In the illustrated embodiment, the housing 20 is configured to cover the internal components of the digital pathology apparatus and these elements include electronics that generate electromagnetic radiation. Such radiation is regulated by industry emission standards and electronic devices typically include some sort of electromagnetic radiation shielding. Typically such shielding is in the form of conductive paints or other coatings that are applied to an interior surface of the housing, but such conductive paints or other coatings are expensive and complicated to apply. These coatings also can vary effectiveness of electromagnetic shielding. Advantageously, the shielding fabric described herein does not vary in its effectiveness of electromagnetic shielding.

In the illustrated embodiment, the interior surface of the housing 20 has an electromagnetic shielding fabric applied to it to reduce radiation emissions from the apparatus 10 to acceptable levels. One example electromagnetic shielding fabric that may be used is Shieldex Nora Dell—CR. In one embodiment, the shielding fabric is applied to the interior surface of the housing 20 by spraying a contact adhesive on the interior surface of the housing 20 and pressing the shielding fabric onto the adhesive covered interior surface of the housing 20.

Example Embodiments

In an embodiment, a digital pathology apparatus includes a base having a left side, a right side, a front side, an end side, and a bottom surface. A portion of the base is configured to engage a surface upon which the digital pathology apparatus is supported. The apparatus also includes a back extending upward along the end side of the base and a bearing system having a plurality of bearing sets. At least one left side bearing set is positioned along the left side of the base and at least one right side bearing set is positioned along the right side of the base. The apparatus also includes a housing having a left side having a lower edge, a right side having a lower edge, a front side having a lower edge, and a top side connecting the left side and the right side and defining a U shape for the housing, wherein the left side lower edge, the right side lower edge and the front side lower edge are substantially parallel to each other. The apparatus also includes a left side rail secured to the left side lower edge of the housing and a right side rail secured to the lower edge of the right side of the housing. The left side rail is configured to engage the at least one left side bearing set and the right side rail is configured to engage the at least one right side bearing set. The apparatus also includes a latching system having a mechanical latch and a sensor configured to determine when the housing is in a closed position and when the housing is in an open position, wherein the left side rail and right side rail of the housing are configured to slide along the at least one left side bearing set and the at least one right side bearing set, respectively, to position the housing in a closed position or an open position.

In an embodiment, a digital pathology apparatus includes a base having a top surface and a bottom surface. The top surface is configured to support a plurality of electrical and mechanical components, the bottom surface is configured to engage a surface upon which the digital pathology apparatus is supported. The apparatus also includes a housing having a plurality of sides and a top, the housing configured to engage the base and cover the plurality of electrical and mechanical components, wherein the plurality of electrical and mechanical components comprises one or more speakerless audio assemblies, each speakerless audio assembly including a spring arm and an exciter connected to the spring arm. The spring arm is positioned to press the exciter into contact with the housing when the housing is engaged with the base and covering the plurality of electrical and mechanical components.

In an embodiment, a digital pathology apparatus includes a base having a top surface and a bottom surface, the top surface configured to support a plurality of electrical components, the bottom surface configured to engage a surface upon which the digital pathology apparatus is supported. The apparatus also includes a housing having a plurality of sides and a top, the housing configured to engage the base and cover the plurality of electrical components in the closed position, wherein the housing has in interior surface and an exterior surface and at least one side of the housing comprises one or more openings. The apparatus also includes an electromagnetic shielding material applied to only a portion of the interior surface of the housing.

In one embodiment of the digital pathology apparatus, the electromagnetic shielding material is not applied to the interior surface of the at least one side of housing comprising one or more openings. In one embodiment of the digital pathology apparatus, the electromagnetic shielding material is a fabric and is secured to the interior surface of the housing by an adhesive. In one embodiment of the digital pathology apparatus, the electromagnetic shielding material is shieldex nora dell—cr.

FIG. 8A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system or a scanning system) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description that follows, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555. In one embodiment, the processor is configured to control movement of the scanning stage and to control activation of the sensor pair. The processor is also configured to receive and analyze the signal from the sensor pair to determine the presence or absence of a glass slide or the stage, as appropriate for the circumstances. In one embodiment, the processor is configured to control the stage to stop movement if an improper position of a glass slide is determined.

The memory 565 provides storage of data and instructions for programs that can be executed by the processor 555. The memory 565 may include one or more volatile and persistent computer-readable storage mediums that store the data and instructions, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In one embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may also be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In one embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise XY movement under control of the processor 555 or the motion controller 570. The movable stage may also be configured for movement in Z under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In one embodiment, the scanner system 550 may employ a high precision and tightly coordinated XY grid to aid in the location of the sample 590 on the movable stage 580. In one embodiment, the movable stage 580 is a linear motor based XY stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate, for example a 96-well plate. Other examples of the sample 590 include integrated circuit boards, electrophoresis records, petri dishes, film, semiconductor materials, forensic materials, or machined parts.

Objective lens 600 is mounted on the objective positioner 630 which, in one embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall scanning system 550 operation.

In one embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, etc. The objective lens 600 combined with focusing optics 610 provides the total magnification for the scanning system 550. In one embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays, for example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in one embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In one embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly, for example via a network (not shown).

Figures 8B, 8C, 8D:
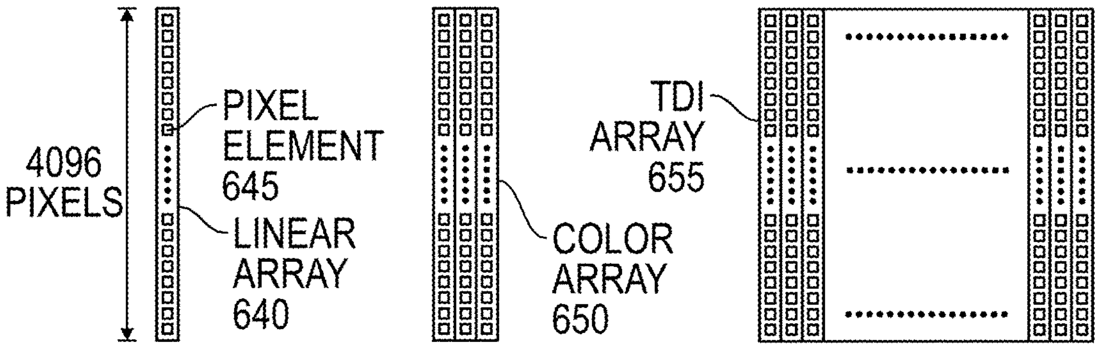
FIG. 8B is a block diagram illustrating an example line scan camera having a single linear array.
FIG. 8C is a block diagram illustrating an example line scan camera having three linear arrays.
FIG. 8D is a block diagram illustrating an example line scan camera having a plurality of linear arrays.

FIG. 8B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

FIG. 8C illustrates a line scan camera having three linear arrays, each of which may be implemented as a CCD array. The three linear arrays combine to form a color array 650. In one embodiment, each individual linear array in the color array 650 detects a different color intensity, for example red, green, or blue. The color image data from each individual linear array in the color array 650 is combined to form a single field of view 625 of color image data.

FIG. 8D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays, for example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital pathology apparatus, comprising:
- a bearing system comprising a left side bearing set and a right side bearing set;
- a housing comprising a left side, a right side, and an exterior surface having a through-hole, the left side comprising a left lower edge and the right side comprising a right lower edge, wherein the left lower edge and the right lower edge are oriented in a parallel manner;
- a left side rail secured to the left lower edge of the housing, the left side rail configured to engage the left side bearing set, wherein the left side rail is configured to slide along the left side bearing set to position the housing in a closed position or an open position;
- a right side rail secured to the right lower edge of the housing, the right side rail configured to engage the right side bearing set, wherein the right side rail is configured to slide along the right side bearing set to position the housing in the closed position or the open position;
- a latching system configured to secure the housing in the closed position; and
- a sensor system configured to determine whether the housing is in the closed position or the open position and thus cease an operation of the digital pathology apparatus when in the open position,
- wherein the digital pathology apparatus is configured to pass information through the through-hole and thereby between a user and the digital pathology apparatus when the housing is in the closed position.

2. The digital pathology apparatus of claim 1, wherein the latching system comprises:
- a first latching portion secured to an inner surface of the housing; and
- a second latching portion secured to a back of the digital pathology apparatus, wherein the first latching portion and the second latching portion are configured to mechanically engage to secure the housing in the closed position.

3. The digital pathology apparatus of claim 1, wherein the left side rail comprises one or more adhesive flanges extending toward a top side of the housing.

4. The digital pathology apparatus of claim 3, wherein the left side rail is secured to the left lower edge of the housing by one or more of fasteners or adhesive.

5. The digital pathology apparatus of claim 1, wherein the sensor system comprises a first sensor portion secured to an inner surface of the housing and a second sensor portion secured to a back of the housing, wherein the sensor system is further configured to generate a signal based on a positioning of the first sensor portion and the second sensor portion within a predetermined proximity.

6. The digital pathology apparatus of claim 5, wherein the first sensor portion comprises a magnet and the second sensor portion comprises a magnetic sensor, wherein the magnetic sensor is configured to detect the magnet within a predetermined proximity.

7. The digital pathology apparatus of claim 5, wherein the first sensor portion comprises a magnetic sensor and the second sensor portion comprises a magnet, wherein the magnetic sensor is configured to detect the magnet within a predetermined proximity.

8. The digital pathology apparatus of claim 5, further comprising one or more processors configured to:

monitor the sensor system; and determine whether the housing is in the open position or the closed position based at least in part on a signal generated by the sensor system.

9. The digital pathology apparatus of claim 8, wherein, to transition the housing between the open position and the closed position, the one or more processors are further configured to stop movement of a moving part of the digital pathology apparatus.

10. The digital pathology apparatus of claim 1, further comprising a base, wherein the bearing system is positioned proximal a front side of the base.

11. The digital pathology apparatus of claim 10, wherein the left side bearing set comprises an upper bearing and a lower bearing, wherein a vertical distance between a lower surface of the upper bearing and an upper surface of the lower bearing corresponds to a thickness of the left side rail.

12. The digital pathology apparatus of claim 11, wherein, based on a positioning of the housing in the open position, an upper surface of the left side rail engages the lower surface of the upper bearing and a lower surface of the left side rail engages the upper surface of the lower bearing.

13. The digital pathology apparatus of claim 10, wherein the right side bearing set comprises an upper bearing and a lower bearing, wherein a vertical distance between a lower surface of the upper bearing and an upper surface of the lower bearing corresponds to a thickness of the right side rail.

14. The digital pathology apparatus of claim 13, wherein, based on a positioning of the housing in the open position, an upper surface of the right side rail engages the lower surface of the upper bearing and a lower surface of the right side rail engages the upper surface of the lower bearing.

15. A digital pathology system, comprising:

an internal apparatus;

a bearing system comprising a left side bearing set and a right side bearing set;

a housing comprising a left side and a right side, the left side comprising a left lower edge and the right side comprising a right lower edge, wherein the left lower edge and the right lower edge are oriented in a parallel manner;

a left side rail secured to the left lower edge of the housing, the left side rail configured to engage the left side bearing set, wherein the left side rail is configured to slide along the left side bearing set to position the housing in a closed position or an open position;

a right side rail secured to the right lower edge of the housing, the right side rail configured to engage the right side bearing set, wherein the right side rail is configured to slide along the right side bearing set to position the housing in the closed position or the open position, wherein the housing covers lateral sides of the digital pathology system when in the closed position; and a sensor system configured to determine whether the housing is in the closed position or the open position.

16. The digital pathology system of claim 15, further comprising a base, wherein the bearing system is positioned proximal a front side of the base.

17. The digital pathology system of claim 16, wherein the left side bearing set comprises an upper bearing and a lower bearing, wherein a vertical distance between a lower surface of the upper bearing and an upper surface of the lower bearing corresponds to a thickness of the left side rail.

18. The digital pathology system of claim 17, wherein, based on a positioning of the housing in the open position, an upper surface of the left side rail engages the lower surface of the upper bearing and a lower surface of the left side rail engages the upper surface of the lower bearing.

19. The digital pathology system of claim 16, wherein the right side bearing set comprises an upper bearing and a lower bearing, wherein a vertical distance between a lower surface of the upper bearing and an upper surface of the lower bearing corresponds to a thickness of the right side rail.

20. The digital pathology system of claim 19, wherein, based on a positioning of the housing in the open position, an upper surface of the right side rail engages the lower surface of the upper bearing and a lower surface of the right side rail engages the upper surface of the lower bearing.

* * * * *